Feb. 7, 1956     A. A. LEEBOW     2,733,846
ARTICLE SUPPORT
Filed March 31, 1953
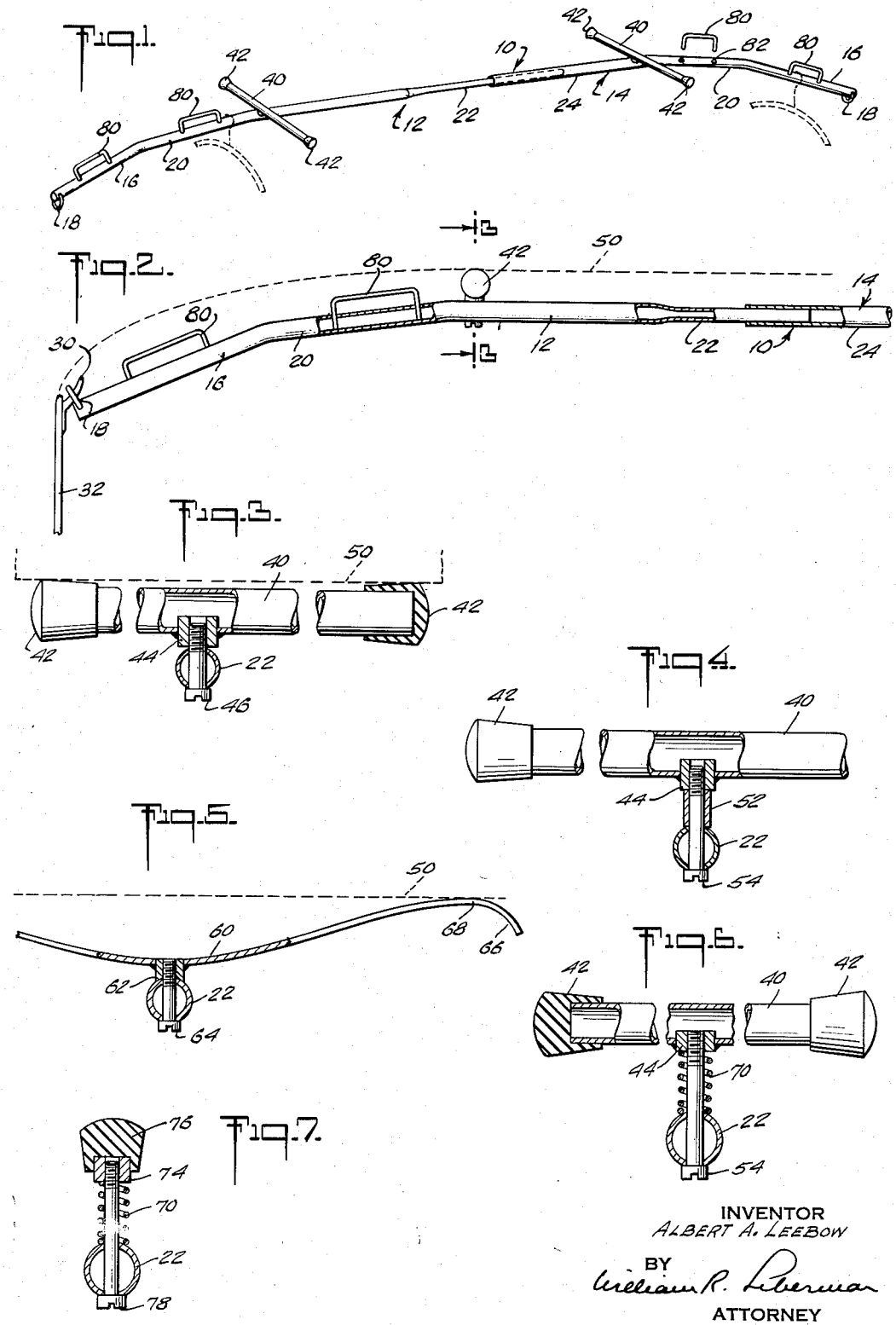
INVENTOR
ALBERT A. LEEBOW
BY
William R. Liberman
ATTORNEY

United States Patent Office 2,733,846
Patented Feb. 7, 1956

2,733,846

ARTICLE SUPPORT

Albert A. Leebow, East Rockaway, N. Y., assignor to Berkeley Industries, Jersey City, N. J., a corporation of New Jersey Application March 31, 1953, Serial No. 345,838

8 Claims. (Cl. 224—42.1)

The present invention relates generally to article supporting devices, and in particular, it relates to article supporting devices for use within automobiles, although not limited to such particular uses.

The problem of suspending such articles as clothes hangers, for instance, within automobiles has long plagued the car owner. While, within closed body cars such as sedans, hardtop convertibles, and the like, a hook is provided on both sides thereof, at the rear and near the top thereof, these hooks will each accommodate but one or two clothes hangers. The articles suspended from these hangers, so suspended, will not drape properly, and after a while they become wrinkled and unsightly, besides blocking the doorways and rendering access to the interior of the car quite difficult.

Many expedients have been attempted to solve this problem, but none thereof has proven generally acceptable. Cords or wires have been stretched across the width of the car at the rear thereof, and articles suspended therefrom, but these sag under the weight of the suspended articles, and the hangers tend to slide back and forth in response to the motion of the car. Brackets have been provided, and welded to the underside of the car roof from which article supports have been suspended, but this expedient is necessarily a costly proposition and renders the car interior unsightly, in addition to which the permanent depending bracket constitutes a hazard during movement into and out of the car.

It is the main object of the present invention, therefore, to provide a new and useful article support for mounting within the interior of an automobile body easily and quickly.

It is an associated main object of the present invention to provide a new and useful article support which may be demountably disposed within the interior of an automobile body.

It is a further object of the present invention to provide an article support member within the interior of an automobile body adjacent to and spaced slightly from the underside of the roof, said support extending from one side of the car to another, and following substantially the contour of the roof.

Associated objects are the provision of means on the support member adapted to bear against the underside of the car roof to prevent rocking of the support; means on the support to limit or prevent article hanger elements from sliding back and forth; and means to accommodate the support for use within cars having differently sized or shaped interiors.

Other, further and more specific objects of the present invention will in part be apparent and in part specifically pointed out in the following description of illustrative embodiments thereof, considered in connection with the drawings annexed hereto and forming a part hereof, wherein Figure 1 is a perspective view of one form of device constructed according to and embodying the present invention;

Figure 2 is a side elevational view, partly in section, illustrating the installation of the device of Figure 1 in an automobile;

Figure 3 is a section on the line 3—3 of Figure 2, partly in elevation;

Figure 4 is a view similar to Figure 3 of a modified mounting;

Figures 5 and 6 are views similar to Figures 3 and 4 of modified forms of bracing members; and Figure 7 is a vertical section through still another form of brace.

The device, according to the present invention, is characterized by a pair of arms each having a bail or loop at the outer end thereof, and of tubular material at their inner proximating ends, one of which is telescopically received within the other. Each rod is divided into a plurality of portions, angled downwardly with respect to each other from the inner to the outer ends to follow the normally curved contour of the roof of the car in transverse section. The center, interfitted portions are straight, and the adjacent portions are successively bent downwardly thereby to impart an over-all arched or contoured appearance. The telescoping of the inner end portions permits the device to be used in automobile interiors of differing widths. The loop-provided outer ends are threaded over the hooks on the sides of the car, the members of necessity being relatively interfitted to achieve the necessary transverse distance between the hooks on the car sides. A pair of bracing members are provided atop the member to bear against the underside of the car roof in order to prevent rocking or pivoting of the member. Locating pins or clips are mounted on the support to keep hanger elements suspended therefrom from shifting beyond desired limits.

The device generally is indicated by reference numeral 10, and comprises a pair of similarly shaped members 12, 14. The members 12, 14 may be formed of tubular material such as steel, aluminum, wood or the like. I have found that tubular steel is well adapted for the purposes hereof. Each member 12, 14 is provided with downturned outer end portions as 16, 16 having a hook-engaging ring, bail or loop 18 at the end thereof. Adjacent the outer portions 16, 16 are intermediate portions 20, 20 angled with respect to the outer portions. While but one intermediate portion as 20 is shown herein, it will be obvious that more may be provided. The inner end portions 22, 24, adjacent the intermediate portions, are necessarily straight, and one thereof, 22, is of reduced diameter so that it may slide freely within the other inner end portion 24.

For any particular car, the members 12, 14 are interfitted and relatively adjusted to such length, from end-to-end thereof, as the car into which the support is to be mounted is wide across the rear thereof. Most closed or hard-top automobiles are conventionally provided with upwardly directed hooks, as 30, on the side panels 32 of the car or the side edges of the roof, over the space between the rear of the front seat and the front of the rear seat, and the bails or loops 18, 18 are fitted thereover (see Figure 3).

In order to prevent rocking or swaying of the support, bracing members are provided. Referring to Figures 1 to 3, each brace constitutes a short length tubular rod 40, having rubber caps 42, 42 fitted over the ends thereof. A threaded tapping or nut 44 is provided on the underside of each rod 40, midway between the ends thereof. Inner end portions 22, 24 are vertically tapped immediately adjacent the intermediate portions 20, 20, and a threaded bolt 46 inserted upwardly therethrough to engage nut or tapping 44. The straight, horizontally-extending inner end portions 22, 24 thus have successive portions 20, 16, each downwardly angled with respect to the preceding portion so that, as seen in elevation as in Figure 2, the support 10 will follow, to some appreciable extent, the cross-sectional contour of the roof of the car body, indicated at 50. When the car roof 50 is relatively shallow, brace rods 40, 40 may be mounted directly atop portions 22, 24, with the rubber tips 42, 42 bearing against the underside of the roof and extending lengthwise of roof 50 and at right angles to members 12, 14.

When the car roof is upwardly curved or arched, a collar or sleeve as 52 may be interposed between braces 40, 40 and members 22, 24, necessitating also a longer bolt as 54, to provide the proper filler between member 10 and the underside of roof 50, see Figure 4.

In Figure 5, a different form of bracing is illustrated, this comprising a shallow U-shaped leaf spring 60, having a threaded tapping or nut 62 midway between the ends thereof for securement to members 22, 24 by a bolt as 64 extending upwardly from the underside of and through vertically aligned apertures in said members. The ends of spring 60 are arched over and downwardly, as at 66, the crests 68 being substantially higher than the support body, providing a resilient and yieldable bracing against the underside of roof 50.

Still another modified bracing is illustrated in Figure 6, wherein parts similar to those in the modifications of Figures 3 and 4 are referred to by similar reference numbers. In this modification, an expansion coil spring as 70 is trapped about bolt 54 between the underside of brace 40 and the top of member 20. With this form, a resilience is imparted to the bracing to accommodate sudden stresses or strains.

It is clear, therefore, that the bracing against the car roof in a line at right angles to the support proper will prevent rocking or turning of member 10 when the latter is suspended from car hooks 30, 30, around the bails or loops 18, 18, due to the even slight pressure exerted against the car roof 50 by the capped ends 42, 42, as in Figures 1 to 4 and 6, or the spring crests 68 as in Figure 5. This will be accomplished, with the bracings described and illustrated herein, provided the distance in a vertical line from a point on an imaginary line connecting hooks 30, 30 across the car to the ends of bars 40 or springs 60 is greater than the distance, also on a vertical line, from the said point to the underside of the roof in the car being used.

It has been found that "point" instead of "line" bracing will prevent rocking if substantial pressure of the brace at the point of contact with the underside of the car roof is maintained. In Figure 7, I have illustrated this modification, wherein an expansion coil spring 70 is trapped between the top of the support members as 22, 24 and the underside of a threaded nut 74 seated within a button consisting of rubber cap 76, a threaded rod 78 passing upwardly through vertically aligned openings through member 22, through spring 70 and into nut 74. In the yieldable bracings of Figures 6 and 7, any sudden flexing of the car roof in a downward direction will be absorbed by springs 70 without displacement of the engagement of caps 42, 76 and the underside of the car roof.

In order to prevent items, as clothes hangers or hooks, from sliding back and forth along members 12, 14, between the outer ends and the braces or between the braces, a suitable number of inverted U-shaped locating pins 80, 80 may be seated in openings 82, 82 tapped into the members 12, 14 from the top thereof, their functioning being obvious.

The device of the present invention is simple and easy to make, comprises relatively few parts all readily available; it may be installed within and removed from a car easily and quickly, requiring no particular skills either for its manufacture or use. The support, as a unit, may be disassembled for shipment and for storage with very little difficulty.

Having described by invention, what I claim and desire to secure by Letters Patent is:

1. In combination with an automobile body having side walls and a ceiling and opposing hook elements mounted on the confronting faces of said side walls, an article supporting device comprising a pair of longitudinally extending elongated members slidably interfitted at their inner ends and having means at their outer ends releasably engaging said hook elements, and a transversely extending bracing member mounted on said elongated members and spaced inwardly of the outer ends thereof and bearing against said ceiling.

2. The combination in accordance with claim 1, wherein said bracing member extends at substantially right angles to said elongated members.

3. The combination in accordance with claim 1, wherein the bracing member is yieldably mounted atop the elongated members and is normally urged upwardly thereof.

4. In combination with an automobile body having side walls and a ceiling and opposing hook elements mounted on the confronting interior faces of said side walls, an article supporting device comprising a pair of longitudinally extending elongated members, each having a straight horizontal inner section and a plurality of integral sections successively angled downwardly from the inner section and each other, the outer end of the outermost section having means thereon releasably engaging said hook elements, the inner ends of the inner sections being slidably interfitted, and a transversely extending bracing member mounted upon said elongated side members and bearing against said ceiling.

5. The combination in accordance with claim 4, wherein there are provided a plurality of bracing members atop the ends of the inner sections adjacent the first succeeding sections angled downwardly therefrom.

6. The combination in accordance with claim 4, wherein there is provided means atop the elongated members to limit movement lengthwise thereof of hanger elements disposed thereon.

7. The combination in accordance with claim 5, wherein the bracing members extend at right angles to the elongated members, and the vertical distances between a point on a line through the outer ends of the elongated members and the ends of the bracing members are greater than the vertical distance between a point on said aforementioned line and a horizontal line through the uppermost point on the bracing members.

8. In combination with an automobile body having side walls and a cealing and opposing hook elements mounted on the confronting faces of said side walls, an article supporting device comprising a pair of longitudinally extending elongated members with straight inner portions and downwardly turned outer portions, one of the inner portions telescoped within the other thereof, the ends of the outer portions having means releasably engaging said hook elements, and a transversely extending bracing member atop each straight portion bearing against said ceiling.

References Cited in the file of this patent

UNITED STATES PATENTS

| | | |
|---|---|---|
| 1,307,069 | Weismantel et al. | June 17, 1919 |
| 1,908,450 | Rutherford | May 9, 1933 |
| 2,020,991 | Brody | Nov. 12, 1935 |
| 2,493,158 | Mitchell | Jan. 3, 1950 |
| 2,494,318 | Sturk | Jan. 10, 1950 |
| 2,522,174 | Hermsmeyer | Sept. 12, 1950 |
| 2,573,275 | Richey | Oct. 30, 1951 |
| 2,585,231 | Dorsey | Feb. 12, 1952 |
| 2,628,751 | Bain | Feb. 17, 1953 |
| 2,689,673 | Richmond | Sept. 21, 1954 |